(12) United States Patent
Nakamura

(10) Patent No.: US 8,427,600 B2
(45) Date of Patent: Apr. 23, 2013

(54) SURFACE LIGHT SOURCE APPARATUS AND LIQUID CRYSTAL DISPLAY APPARATUS

(75) Inventor: Mayumi Nakamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 165 days.

(21) Appl. No.: 13/125,828

(22) PCT Filed: Jul. 14, 2009

(86) PCT No.: PCT/JP2009/062761
§ 371 (c)(1),
(2), (4) Date: Apr. 25, 2011

(87) PCT Pub. No.: WO2010/052955
PCT Pub. Date: May 14, 2010

(65) Prior Publication Data
US 2011/0199559 A1    Aug. 18, 2011

(30) Foreign Application Priority Data
Nov. 4, 2008    (JP) ................................. 2008-283638

(51) Int. Cl.
*G02F 1/1335*    (2006.01)
(52) U.S. Cl.
USPC .......................................................... 349/62
(58) Field of Classification Search ........................ None
See application file for complete search history.

(56) References Cited

U.S. PATENT DOCUMENTS

| 6,580,477 | B1 | 6/2003 | Cho |
| 6,997,582 | B2 * | 2/2006 | Yang et al. ..................... 362/373 |
| 7,036,956 | B1 | 5/2006 | Chou |
| 7,542,108 | B2 * | 6/2009 | Saito et al. ....................... 349/64 |
| 7,796,209 | B2 * | 9/2010 | Ajichi et al. ..................... 349/61 |
| 8,072,412 | B2 * | 12/2011 | Furukawa ...................... 345/102 |
| 8,092,064 | B2 * | 1/2012 | Erchak et al. .................. 362/613 |
| 2001/0017774 | A1 | 8/2001 | Ito et al. |
| 2003/0206253 | A1 | 11/2003 | Cho |
| 2008/0231774 | A1 | 9/2008 | Tomita et al. |
| 2009/0316074 | A1 | 12/2009 | Tomiyoshi |

FOREIGN PATENT DOCUMENTS

| JP | 2001-075096 A | 3/2001 |
| JP | 2001-312916 A | 11/2001 |
| JP | 2006-100225 A | 4/2006 |

(Continued)

OTHER PUBLICATIONS

Official Communication issued in International Patent Application No. PCT/JP2009/062761, mailed on Oct. 13, 2009.

(Continued)

*Primary Examiner* — Sung Pak
(74) *Attorney, Agent, or Firm* — Keating & Bennett, LLP

(57) ABSTRACT

The present invention employs a configuration described as follows, so as to realize a surface light source apparatus which attain a thinness and a further improved luminance uniformity without suffering a deterioration in luminance. Specifically, space maintaining sections (6) are provided on a substrate (4) onto which light sources (2) are mounted, so as to cause an optical sheet (5) and a light emitting surface made up of outputting surfaces (1c) to be away from each other by a given distance. The space marinating sections 6 are provided so as to protrude from respective gaps each of which occurs between adjacent two of light guides (1) which are juxtaposed so as not to overlap each other.

7 Claims, 8 Drawing Sheets

FOREIGN PATENT DOCUMENTS

| | | |
|---|---|---|
| JP | 2006-134748 A | 5/2006 |
| JP | 2006-302581 A | 11/2006 |
| JP | 2006-302687 A | 11/2006 |
| JP | 2009-252572 A | 10/2009 |
| JP | 2010-033818 A | 2/2010 |
| WO | 2008/050509 A1 | 5/2008 |

OTHER PUBLICATIONS

Official Communication issued in corresponding European Patent Application No. 09824655.6, mailed on Mar. 7, 2013.

* cited by examiner

F I G. 1
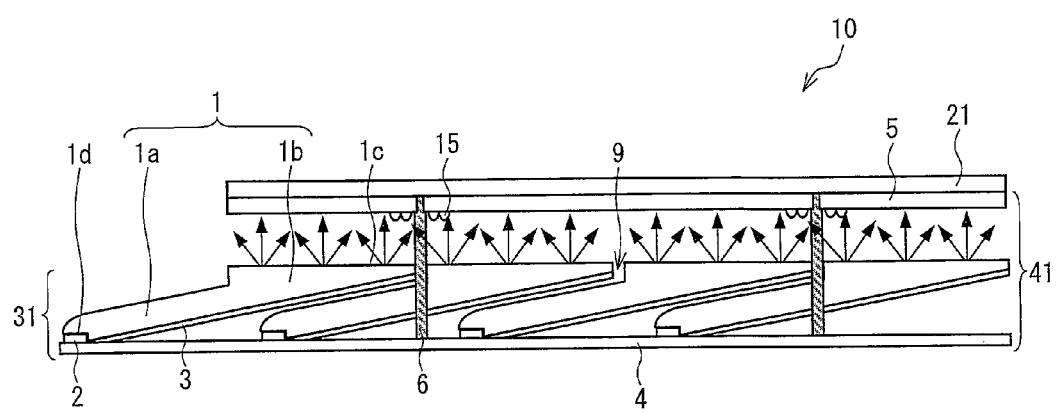

SURFACE LIGHT SOURCE APPARATUS AND LIQUID CRYSTAL DISPLAY APPARATUS

TECHNICAL FIELD

The present invention relates to: a surface light source apparatus that is used as a backlight of a liquid crystal display apparatus or the like; and a liquid crystal display apparatus including the surface light source apparatus.

BACKGROUND ART

Liquid crystal display apparatuses have increasingly replaced cathode-ray tube (CRT) display apparatuses. Such liquid crystal display apparatuses have advantages in features such as energy saving, reduced thickness, lightweight, and the like. For their advantages, the liquid crystal display apparatuses have been widely used in liquid crystal display televisions, monitors, mobile phones, and the like. One way to further utilize such advantages of the liquid crystal display apparatuses is to improve an illumination apparatus (a so-called backlight) provided behind a liquid crystal display apparatus.

Illumination apparatuses can be generally classified into a side light type (also known as edge light type) and a direct backlight type. According to the side light type, light guide plates are provided behind a liquid crystal panel and light sources are provided to lateral edges of the respective light guide plates. A light source emits light which is then reflected in a light guide plate such that the liquid crystal display panel is irradiated with the light indirectly and uniformly. This configuration makes it possible to realize an illumination apparatus having a reduced thickness and good luminance uniformity although having a low luminance. Thus, an illumination apparatus of the side light type is mainly used in a medium-to-small-size liquid crystal display of a mobile phone, a laptop personal computer, or the like.

According to the direct backlight, on the other hand, a plurality of light sources are provided behind a liquid crystal display panel so as to directly illuminate the liquid crystal display panel. This makes it easier for even a large screen to have a high luminance. Therefore, an illumination apparatus of the direct backlight type is mainly used in a large-size liquid crystal display of 20 inches or more. However, of illumination apparatus of the direct backlight type, a currently-available one has a thickness in a range of approximately 20 mm to 40 mm. This results in a barrier to a further reduction in thickness of a display.

A further reduction in thickness of a large-size liquid crystal display can be attained by providing light sources and a liquid crystal display panel closer to each other. In this case, however, it is impossible for an illumination apparatus to have luminance uniformity unless a larger number of light sources are provided. Such an increase in the number of light sources leads to higher cost. In such circumstances, there is a demand for development of a thin illumination apparatus in which good luminance uniformity can be obtained without causing an increase in the number of light sources.

In order to solve such problems, it has been attempted to (i) reduce a thickness of a large-size liquid crystal display by employing an illumination apparatus in which a plurality of light guide units are provided and to (ii) improve a luminance uniformity of an illumination apparatus by providing a spacer or the like so as to secure a space between an optical member and a light emitting surface of the illumination apparatus.

Patent literature 1 discloses a configuration in which a protrusion part 118p is provided, on a light emitting surface 118a of a light guide plate 118, above a boundary between corresponding two of light guide plates 118A, 118B, and 118C so as to extend in a direction parallel with a direction in which a parallel trench 118f extends (see (a) of FIG. 10). The protrusion part 118p has a shape similar to an ellipse cut in halves. Thus, an upper portion of the protrusion part 118p is rounded. The protrusion part 118p has a given height and width and extends in the direction parallel with the direction in which the parallel trench 118f extends. The given height of the protrusion part 118p is not limited to a specific one, provided that luminance unevenness of the light emitting surface 118a of the light guide plate 118 can be fully reduced by a film member provided above the light guide plate 118. Neither a location nor the number of the protrusion part 118p is limited to a specific one shown in (a) of FIG. 10. Instead, it is described in the patent literature 1 that any number of the protrusion parts 118p can be provided at any location. Also, a plurality of lenticular lenses 134 are provided, on the light emitting surface 118a, above the parallel trench 118f in which a light source 112 is provided. Further, a reflecting sheet 122 is provided so as to cover an inclined surface (a rear surface in (a) of FIG. 10) of the light guide plate 118.

It is described in the patent literature 1 as follows. Specifically, the protrusion part 118p which is provided on the light emitting surface 118a is used as a spacer whereby an optical member (such as a prism sheet or a diffusing sheet) is away, by a predetermined distance, from a flat part of the light emitting surface 118a. According to this configuration, light emitted from the light emitting surface 118a travels toward the optical member, while overlapping in multiple directions. As such, the light which is to irradiate the optical member is uniformized. This can realize a surface light source apparatus advantageous in view of luminance uniformity.

Patent literature 2 describes a surface light source apparatus 285 configured as shown in (b) of FIG. 10. According to the surface light source apparatus 285, light guide plates 213a, 213b, and 213c, each of which causes surface emission of light emitted from a corresponding one of light sources 211a, 211b, and 211c, are provided independently from each other. Reflecting sheets 214a, 214b, and 214c are provided so as to cover inclined surfaces (rear surfaces in (b) of FIG. 10) of the light guides plates 213a, 213b, and 213c, respectively. A light-shielding layer 241 is provided to a thinnest part of a rear end of each of the light guide plates 213a and 213b. Further, a transparent plate 278 is stacked, above top surfaces of the light guide plates 213a, 213b, and 213c, via an adhesive layer 272a. A diffusing plate 276 is stacked, above the transparent plate 278, via an adhesive layer 272b. According to the configuration, the transparent plate 278 which is thick in thickness is provided between (i) the light guide plates 213a, 213b, and 213c and (ii) the diffusing plate 276, so that (i) the light guide plates 213a, 213b, and 213c and (ii) the diffusing plate 276 are sufficiently away from each other. This can uniformize a light amount unevenness such as a bright line or a dark spot. It is therefore possible to realize a surface light apparatus excellent in view of luminance evenness.

Citation List

Patent Literature 1

Japanese Patent Application Publication, Tokukai, No. 2006-302687 A (Publication Date: Nov. 2, 2006)

Patent Literature 2

Japanese Patent Application Publication, Tokukai, No. 2001-312916 A (Publication Date: Nov. 9, 2001)

Patent Literature 3

Japanese Patent Application Publication, Tokukai, No. 2006-134748 A (Publication Date: May 25, 2006)

Patent Literature 4

Japanese Patent Application Publication, Tokukai, No. 2006-100225 A (Publication Date: Apr. 13, 2006)

Patent Literature 5

Japanese Patent Application Publication, Tokukai, No. 2001-75096 A (Publication Date: Mar. 23, 2001)

SUMMARY OF INVENTION

Technical Problem

The protrusion part 118p of the patent literature 1, which is provided on the light emitting surface 118a of the light guide plate 118, is provided in sole purpose of causing an optical member (a prism sheet or a diffusing sheet) to be away, by a given distance, from the flat part of the light emitting surface 118a. However, no attention has been paid to where the protrusion part 118p should be provided. In this circumstance, there occurs a problem that: light emitted from the light emitting surface 118a of the light guide plate 118 is reflected by the protrusion part 118p so that luminance unevenness is caused, and this causes an emission condition to be uneven. Thus, in a case where such a surface light source apparatus is used as a backlight, a deterioration in display quality is caused.

According to the configuration of the patent literature 1, the protrusion part 118p is provided on the light emitting surface 118a of the light guide plate 118. Generally, a surface of a light guide is worked so as to have a fine structure such as a prism, a lens, or the like. As such, light is emitted from the light guide plate while being scattered by the fine structure. However, in a case where the protrusion part 118p is provided on the light emitting surface 118a of the light guide plate 118, light being emitted from the light emitting surface 118a is scattered also by the protrusion part 118p. Since the protrusion part 118p is much greater than the fine structure (the prism, the lens, or the like) in view of a size, it ends up that a large amount of the light is scattered by the 118p. This leads to an occurrence of a bright spot.

According to the surface light source apparatus 285 of the patent literature 2, the transparent substrate 278 which is thick in thickness is provided between (i) the light guide plates 213a, 213b, and 213c and (ii) the diffusing plate 276 so that (i) the light guide plates 213a, 213b, and 213c and (ii) the diffusing plate 276 are sufficiently away from each other. According to the configuration, it is therefore possible to secure luminance evenness by providing the transparent substrate 278. However, providing of the transparent substrate 278 adversely causes a decrease in luminance.

The present invention is made in view of the problem, and an object of the present invention is to provide a surface light source apparatus which attains a thinness and a further improved luminance uniformity without suffering a decrease in luminance.

Another object of the present invention is to provide a liquid crystal display apparatus which includes the surface light source apparatus so as to attain a thinness and a good display quality.

Solution to Problem

In order to attain the object, a surface light source apparatus includes: a plurality of combinations each including (i) a light source and (ii) a light guide which diffuses light emitted from the light source and causes surface emission of the light; a substrate on which the light sources are mounted; an optical sheet provided above a light emitting surface made up of outputting surfaces of the respective light guides; and a space maintaining section which causes the light emitting surface and the optical sheet to be away from each other by a given distance, the space maintaining section being provided on the substrate so as to protrude from a gap between adjacent two of the light guides which are juxtaposed so as not to overlap each other.

It is preferable that the space maintaining section is provided in such a region on the light emitting surface made up of outputting surfaces of the respective light guides, where luminance is low. This is because the providing of the space maintaining section in the region can reduce a ratio of an amount of light which is reflected by the space maintaining section for an amount of light which is emitted from the light emitting surface. It is therefore possible to reduce an influence by the space maintaining section on luminance distribution in the light emitting surface.

The following description discusses in detail such a region of the light emitting surface where luminance is low.

<Gap Between Adjacent Two of Light Guides which are Juxtaposed so as not to Overlap Each Other>

Generally, light guides are manufactured according to a minus tolerance, by taking into consideration at least the fact that (i) the plurality of light guides will damage one another, (ii) the illumination apparatus should be thin, and (iii) a manufacturing error will occur. It follows that gaps, which correspond to such a minus tolerance, occur in respective joint regions where corresponding two of the plurality of light guides are juxtaposed. On a light emitting surface which is made up of juxtaposition of the outputting surfaces of the respective plurality of light guides, the gaps are respective regions where no light emission is carried out. Thus, the gaps are the respective region where luminance is low.

Note that the gap, between the adjacent two of the plurality of light guides which are juxtaposed so as not to overlap each other, indicates a gap between the adjacent two of the plurality of light guides which are juxtaposed in a single plane. For example, according to an illumination apparatus (illumination apparatus of tile type) in which light guides are provided so as not to overlap with each other, a gap between adjacent two of the light guides is a gap which occurs, around each light guide (in a case where the light guides are shaped rectangular in a plane, for example, around four (4) sides of each light guide), between adjacent two of the light guides which are juxtaposed so as not to overlap each other.

On the other hand, according to an illumination apparatus (illumination apparatus of tandem type) in which a light emitting section of one of adjacent two of light guides is above a light guide section of the other of the adjacent two of light guides, there exist (i) a gap between adjacent two of the light guides which are juxtaposed so as not to overlap each other and (ii) a gap between another adjacent two of light guides which are juxtaposed so as to overlap each other. The above-described configuration pays no attention to the gap (ii) between another adjacent two of light guides which are juxtaposed so as to overlap each other occurring in the illumination apparatus of tandem type.

According to the configuration of the present invention, the space maintaining section is provided on a substrate onto which the plurality of light source are mounted, so as to protrude from the gap between the adjacent two of the light guides which are juxtaposed so as not to overlap each other. This makes it unnecessary to employ a thick transparent substrate in order to keep the light emitting surface and the optical sheet away from each other by a given distance. As such, it is possible to avoid a decrease in luminance.

According to the configuration of the present invention, the space maintaining section is provided in the gap between the adjacent two of the light guides which are juxtaposed so as not to overlap each other, i.e., the gap which is viewed as a dark region on the light emitting surface. This can prevent luminance unevenness which is caused as the light, having been emitted from each of the light outputting surfaces of the respective plurality of light guides, is reflected by the space maintaining section.

Furthermore, according to the configuration of the present invention, the space maintaining section secures a given space between the light emitting surface and the optical sheet. This allows light emitted from each of the light outputting surfaces to overlap each other in multiple directions so as to be uniformized in the space. It is therefore possible to improve luminance uniformity.

Generally, surfaces of the light guides are subjected to microfabrication so as to have prisms and/or lenses. Light propagating inside each of the light guides is scattered by fine shapes obtained by the microfabrication, so as to be directed outward.

According to the configuration, the space maintaining section is provided on the substrate onto which the plurality of light sources, which are members other than the plurality of light guides, are mounted. As such, it is rarely the case that the light propagating inside each of the light guides is subjected to a scattering effect by the space maintaining section. This can prevent luminance unevenness.

Thus, the configuration can realize a surface light source apparatus which attains thinness and a further improved luminance uniformity without suffering a reduction in luminance.

With the configuration, it is possible to protect a surface of the optical sheet, in addition to thus reduce the luminance unevenness. Such an effect of protection of the surface of the optical sheet can be attained since the configuration allows the optical sheet and the plurality of light guides to be away from each other by the given distance, unlike in a configuration in which an optical sheet is in close contact with a plurality of light guides. Thus, the configuration is suitable also for the protection of the surface of the optical sheet.

The optical sheet encompasses an optical sheet which brings about some optical effect on an optical property of the light emitted from the light emitting surface, e.g., luminance, luminance distribution, a polarization condition, a color, or the like. A concrete example of the optical sheet is a diffusing plate whose thickness is approximately from 2 mm to 3 mm. For example, a diffusing plate as the above-described optical sheet is provided so as to be away from the light emitting surface by a distance of a few mm. Note, however, that the thickness of the optical sheet is not limited to the one described above, while the distance by which the optical sheet and the light emitting surface are away from each other is not limited to the one described above.

A diffusing sheet, a prism sheet, and/or a multifunction optical sheet such as a polarized light reflecting sheet, each having a thickness of several hundreds of micrometers ($\mu$m), can be stacked on the diffusing plate so that it is possible to secure luminance uniformity satisfactory as the surface light source apparatus.

The thickness and the configuration of the multifunction optical sheet are merely illustrative. The multifunction optical sheet is therefore not limited to them.

According to the surface light source apparatus of the present invention, it is preferable that: each of the light guides has (i) a corresponding light emitting section having a corresponding one of the outputting surfaces and (ii) a corresponding light guiding section that directs, to the corresponding light emitting section, the light emitted from the light source, wherein the light emitting section of any of the light guides is above the light guiding section of adjacent another of the light guides; and the space maintaining section is provided so as to protrude from a region where (a) a gap between adjacent two of the light guides which are juxtaposed so as not to overlap each other and (b) a gap between adjacent two of the light guides which are juxtaposed so as to overlap each other are intersectant to each other at a substantially right angle.

According to the configuration, the space maintaining section is provided at the region where the gaps are intersectant to each other at a substantially right angle. Thus, the space maintaining section is provided at such a location where relative locations of the space maintaining section with respect to respective adjacent four of the light guides, which adjacent four define the gaps, are symmetric. This allows the space maintaining section to evenly affect an optical property of outputting surfaces of light emitting sections of the respective adjacent four of the light guides.

As described earlier, according to the illumination apparatus (the illumination apparatus of tandem type) in which a light emitting section of one of adjacent two of the light guides is above a light guiding section of the other of the adjacent two of the light guides, there exist (i) a gap between another adjacent two of the light guides which are juxtaposed so as not to overlap each other and (ii) a gap between the adjacent two of the light guides which are juxtaposed so as to overlap each other.

The gap, between the adjacent two of the light guides which are juxtaposed so as to overlap each other, indicates, for example, a gap between outputting surfaces of the respective adjacent two of light guides, in a case where the adjacent two of light guides are juxtaposed so that the light emitting section of the one of the adjacent two of light guides is above the light guiding section of the other of the adjacent two of light guides.

That is, the space maintaining section is provided at such a location where a relative location of the space maintaining section with respect to each of light guising sections of respective adjacent four of the light guides (the adjacent two of the light guides which are juxtaposed so as not to overlap each other and the adjacent two of the light guides which are juxtaposed so as to overlap each other) is symmetric. The space maintaining section thus provided protrudes from the region where (i) the gap between the adjacent two of the light guides which are juxtaposed so as not to overlap each other and (ii) the gap between the adjacent two of the light guides which are juxtaposed so as to overlap each other are intersectant to each other at a substantially right angle. According to such a configuration, it is possible to equalize an optical influence by the space maintaining section over an optical property of each of the outputting surfaces of light guiding sections of the respective adjacent four of the light guides. As such, it is possible to allow the space maintaining section to evenly affect luminance distribution in the light emitting surface made up of a plurality of the outputting surfaces. This can improve luminance uniformity in the light emitting surface.

According to the surface light source apparatus of the present invention, it is preferable that: the light guides are provided in a single plane so as not to overlap each other; and the space maintaining section is provided so as to protrude from a region where (i) a gap between adjacent two of the light guides which are juxtaposed so as not to overlap each other and (ii) a gap between another adjacent two of the light guides which are juxtaposed so as not to overlap each other are intersectant to each other at a substantially right angle.

The space maintaining section is thus provided in the region where the gaps (i) and (ii) are intersectant to each other at a substantially right angle. That is, the space maintaining section is provided at such a location where a relative location of the space maintaining section with respect to an outputting surface of each of adjacent four of the light guides (two of which adjacent four of the light guides define the gap (i) and other two of which adjacent four of the light guides define the gap (ii)) is symmetric.

As early described, according to the illumination apparatus (the illumination apparatus of tile type) in which the light guides are provided in a single plane so as not to overlap each other, a gap between adjacent two of the light guides is a gap between adjacent two of the light guides which are juxtaposed so as not to overlap each other.

According to the configuration, the space maintaining section is provided at such a location where a relative location of the space maintaining section with respect to each of light emitting sections of respective adjacent four of the light guides (adjacent two of the light guides which are juxtaposed so as not to overlap each other and the another adjacent two of the light guides which are juxtaposed so as not to overlap each other) is symmetric. The space maintaining section thus provided protrudes from the region where (i) the gap between the adjacent two of the light guides which are juxtaposed so as not to overlap each other and (ii) the gap between the another adjacent two of the light guides which are juxtaposed so as not to overlap each other are intersectant to each other at a substantially right angle. According to such a configuration, it is possible to allow the space maintaining section to evenly affect an optical property of each of outputting surfaces of the respective adjacent four of the light guides. As such, it is possible to allow the space maintaining section to evenly affect luminance distribution in the light emitting surface made up of a plurality of the outputting surfaces. This can improve luminance uniformity in the light emitting surface.

According to the surface light source of the present invention, it is preferable that the space maintaining section is made from a material having a light transmitting property and a light diffusing property.

According to the configuration, the space maintaining section is thus made from the material having the light transmitting property and the light diffusing property. This can reduce an amount of light blocked by the space maintaining section and an amount of light reflected by the space maintaining section. Further, since no space maintaining section blocks traveling of the light emitted from the light emitting surface, it is possible to prevent a reduction in luminance and a reduction in luminance uniformity.

According to the surface light source apparatus of the present invention, it is preferable that the optical sheet is a diffusing plate.

With the configuration, it is possible that the diffusing plate further uniformizes the light which has overlapped one another in the multiple directions to be uniformized in the space between the light emitting surface and the diffusing plate. It is therefore possible to realize a surface light source apparatus whose luminance uniformity is further improved.

According to the surface light source apparatus of the present invention, it is preferable that diffusing means for causing incident light to be further diffused is provided, on the optical sheet, in each region which includes the region where the space maintaining section is provided.

According to the configuration, the diffusing means is thus provided, on the optical sheet so as to include the region where the optical sheet and the space maintaining section contact each other. This can prevent luminance unevenness to be generated due to a presence of the space maintaining section, and thereby further reduce entire luminance.

In order to attain the object, a liquid crystal display apparatus of the present invention includes, as a backlight, any of the surface light source apparatuses described above.

According to the configuration, there is provided, as the backlight, any of the surface light source apparatuses each obtaining reduced thicknesses and further improved luminance uniformities while preventing a reduction in luminance. This can realize the liquid crystal display apparatus which has a reduced thickness and good display quality.

Advantageous Effects of Invention

A surface light source apparatus of the present invention is thus configured so that space maintaining sections, which cause a light emitting surface and an optical sheet to be away from each other by a given distance, are provided on a substrate so as to protrude from respective gaps each of which occurs between corresponding adjacent two of light guides which are juxtaposed so as not to overlap with each other.

A liquid crystal apparatus of the present invention thus includes the surface light source apparatus as a backlight.

This can realize a surface light source apparatus which attains a thinness and a further improved luminance uniformity without suffering any decrease in luminance.

Further, this can realize a liquid crystal display apparatus which includes the surface light source apparatus as a backlight so as to achieve a reduced thickness and a good display quality.

BRIEF DESCRIPTION OF DRAWINGS

FIG. 1

FIG. 1 is a side view showing how a liquid crystal display apparatus is configured, in accordance with one embodiment of the present invention.

FIG. 2 is a plan view obtained when an illumination apparatus in the liquid crystal display apparatus of the one embodiment of the present invention is viewed from above an emission surface.

FIG. 3 is a side view showing the illumination apparatus of the liquid crystal display apparatus in accordance with the one embodiment of the present invention.

FIG. 4 is a perspective view showing the illumination apparatus of the liquid crystal display apparatus in accordance with the one embodiment of the present invention.

Figure 5:
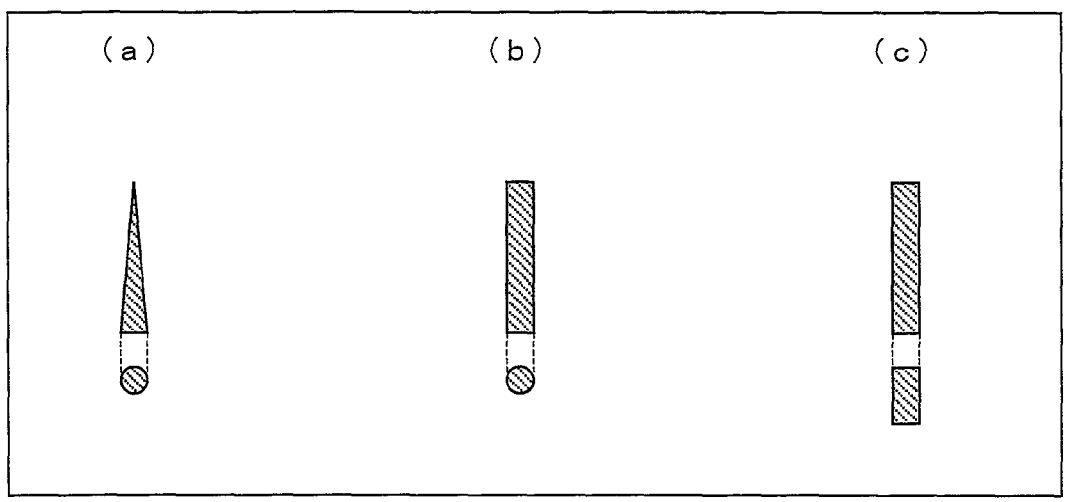
FIG. 5

Each of (a) through (c) of FIG. 5 is a view showing an exemplary shape of a side surface and a bottom surface of a space maintaining section.

FIG. 6

Figure 6:
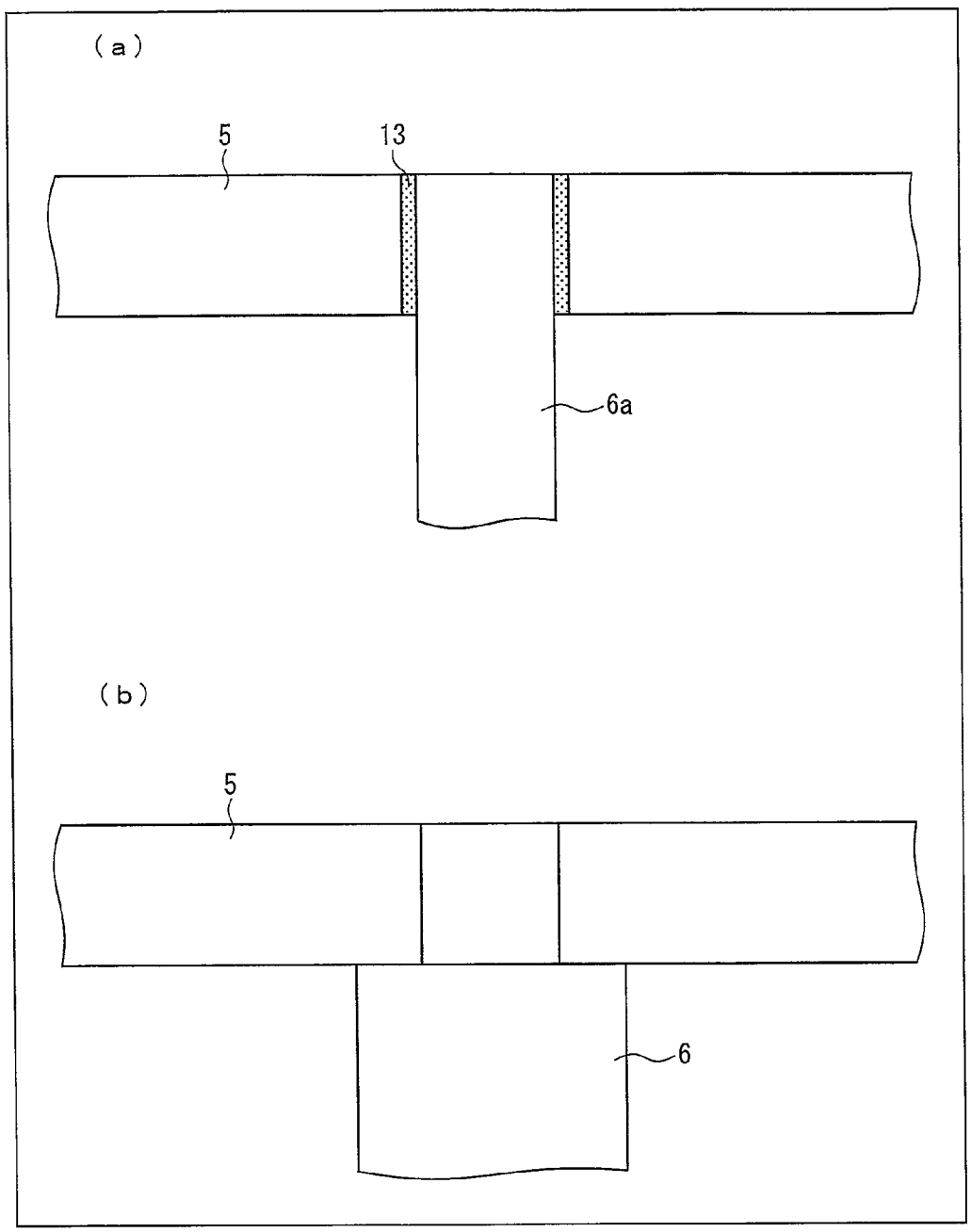

FIG. 6 is a cross sectional view showing an exemplary method for fixing the space maintaining section and an optical sheet.

FIG. 7

Figure 7:
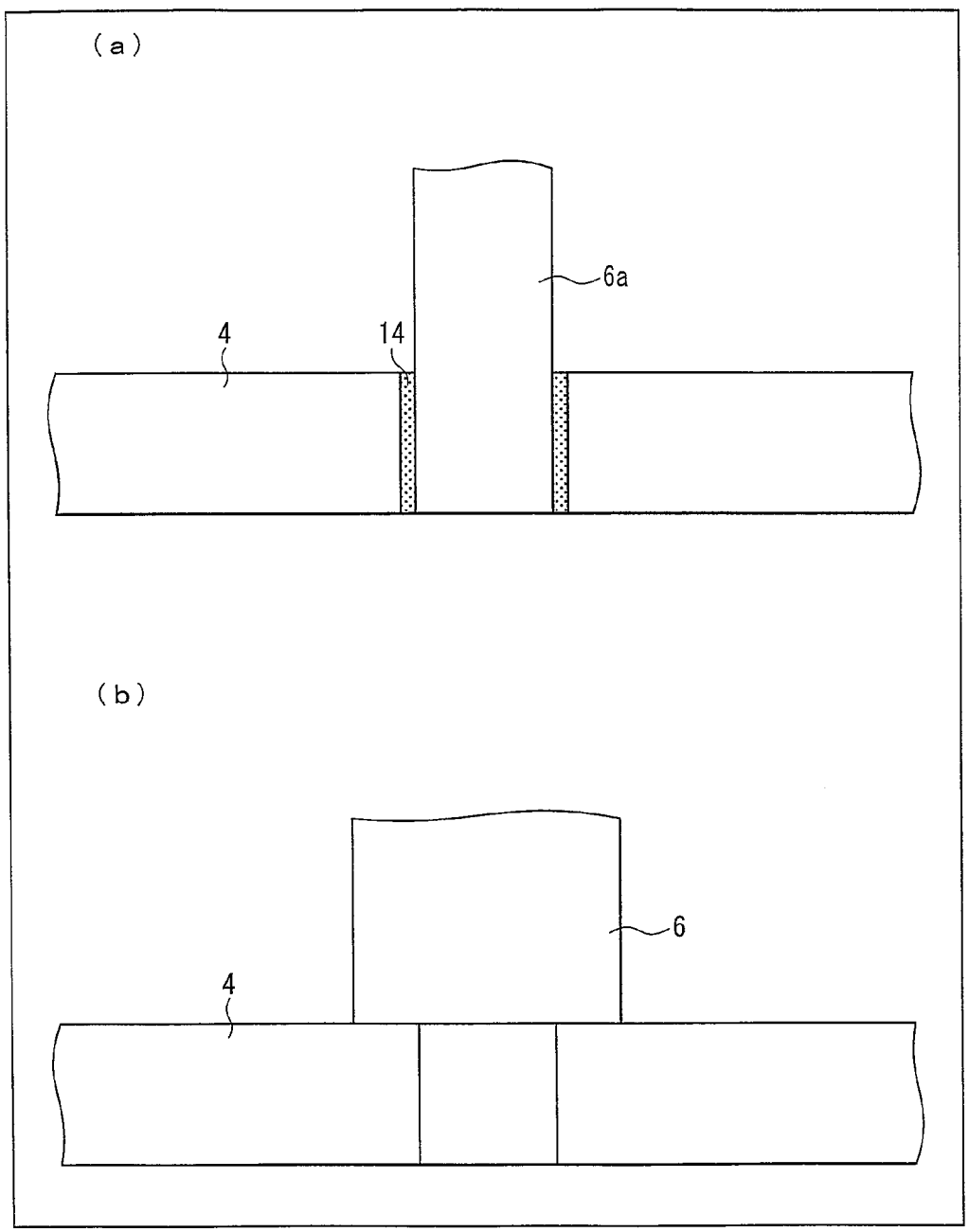

FIG. 7 is a cross sectional view showing an exemplary method for fixing the space maintaining section and a substrate.

FIG. 8

Figure 8:
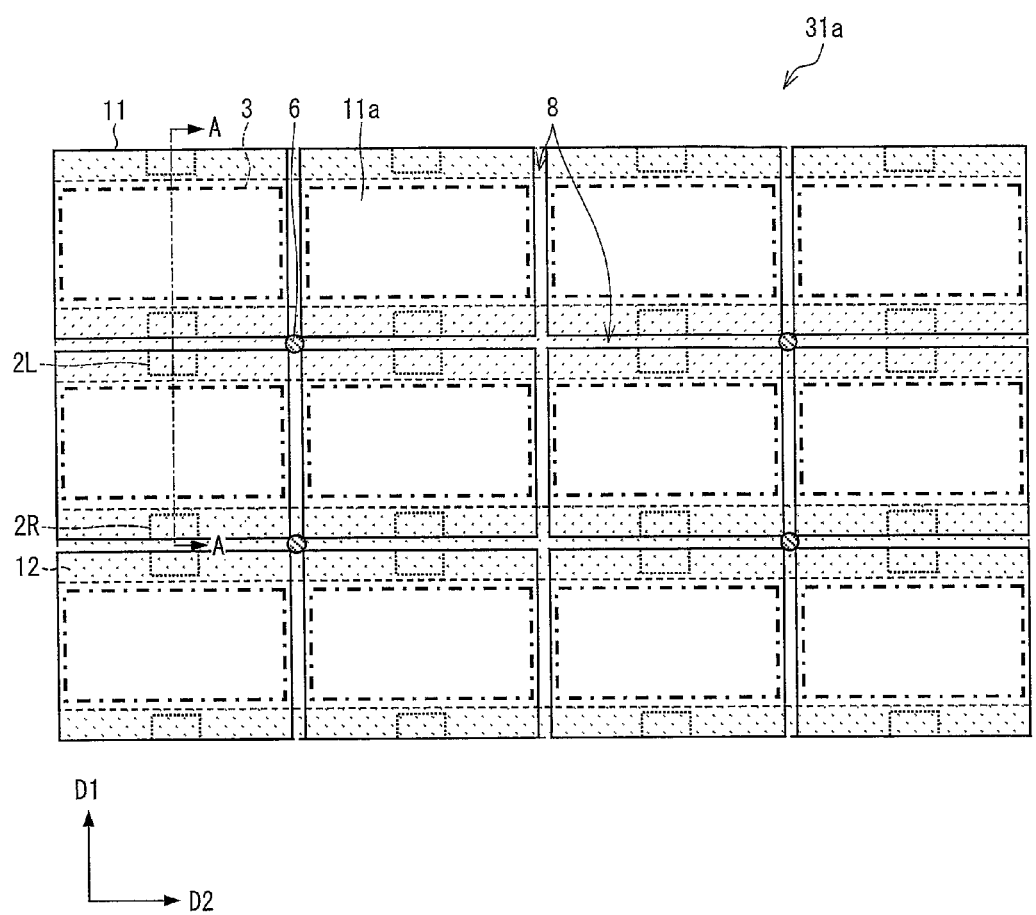

FIG. 8 is a plan view obtained when an illumination apparatus in a liquid crystal display apparatus of another embodiment of the present invention is viewed from above an emission surface.

FIG. 9

Figure 9:
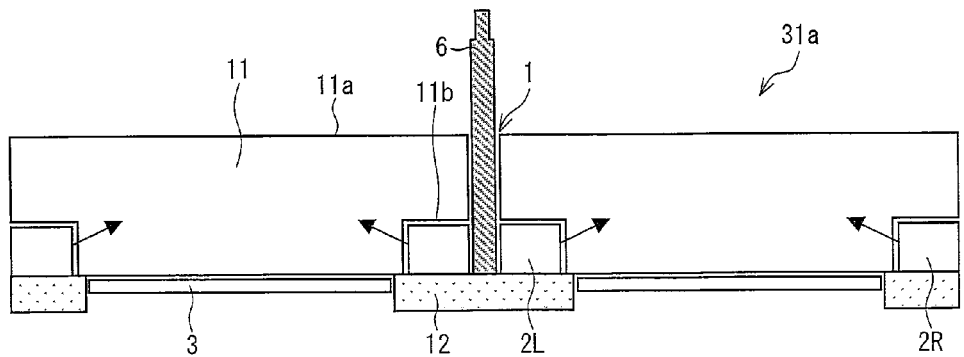

FIG. 9 is a cross sectional view obtained when illumination apparatus shown in FIG. 8 is viewed along the line AA in FIG. 8.

FIG. 10

Figure 10:
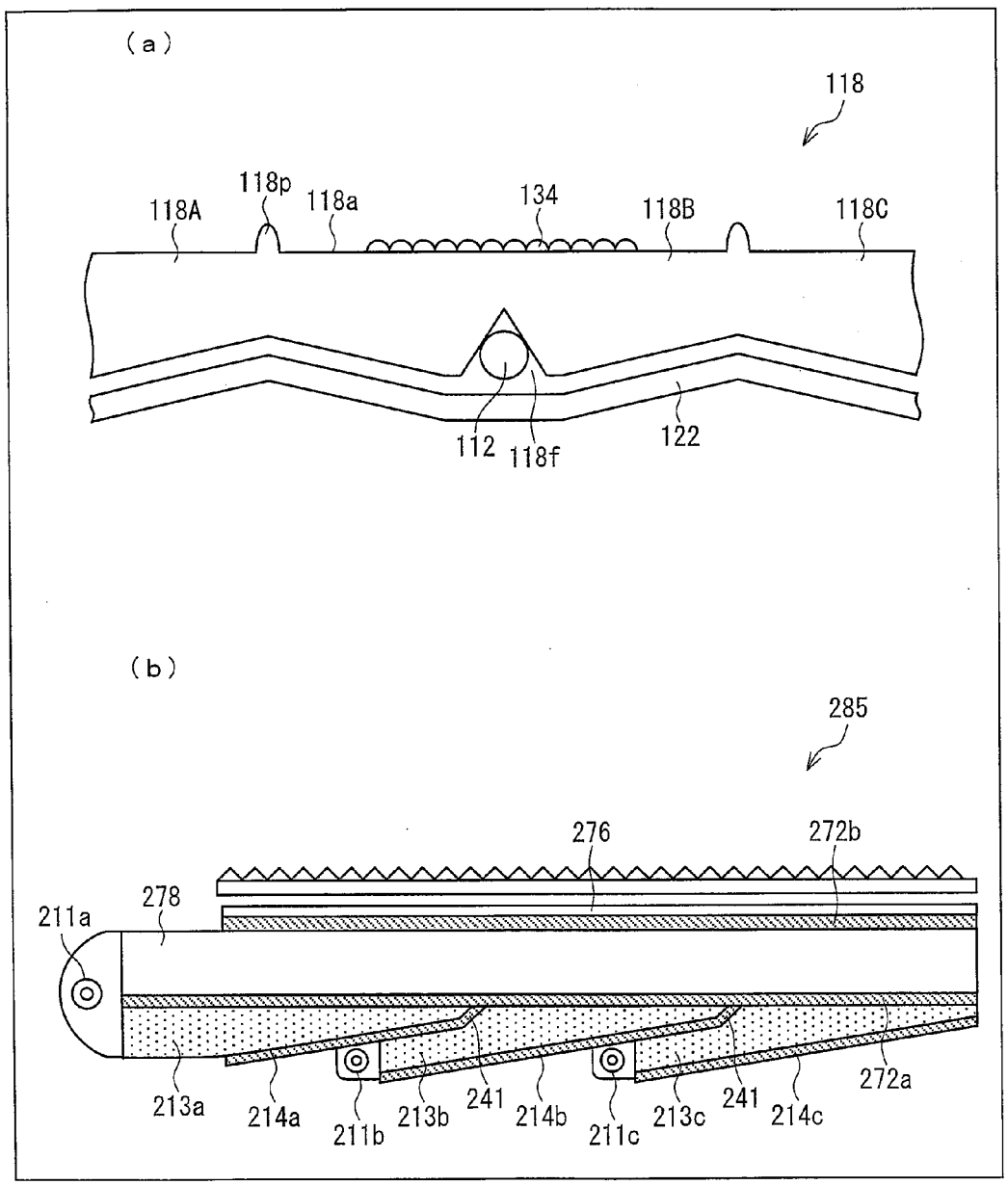

FIG. 10 is a view schematically showing how a conventional surface light source apparatus is configured.

DESCRIPTION OF EMBODIMENTS

With reference to the drawings, the following description discusses examples of embodiments of the present invention in detail. Note, however, that, unless otherwise noted, the scope of the present invention is not intended to be limited to a size, a material, a shape, a relative location, and the like of each constituent exemplified in the embodiments of the present invention. Instead, the size, the material, the shape, the relative location, and the like of each constituent are merely illustrative.

According to a liquid crystal display apparatus of one embodiment in accordance with the present invention, there is provided a surface light source apparatus which is thin and further improves its luminance uniformity without suffering a decrease in luminance. As such, the liquid crystal display apparatus attains a thinness and good display quality. Liquid crystal display apparatuses of respective embodiments in accordance with the present invention are described below with reference to FIGS. 1 through 9.

[Embodiment 1]

FIG. 1 is a side view schematically showing how a liquid crystal display apparatus 10 is configured in accordance with one embodiment of the present invention.

The liquid crystal display apparatus 10 includes a liquid crystal display panel 21 and a surface light source apparatus 41 including an illumination apparatus 31. The surface light source apparatus 41 serves as a backlight for emitting light toward the liquid crystal display panel 21. The illumination apparatus 31 includes a plurality of combinations each made up of a light guide 1 and a light source 2.

The plurality of light guides 1 have respective light guiding sections 1a and respective light emitting sections 1b. Each of the light guiding section 1a guides, toward a corresponding one of the light emitting sections 1b, light having been emitted from a corresponding one of the plurality of light sources 2. The light thus guided is surface-emitted from an outputting surface 1c of the corresponding one of the light emitting sections 1b. The plurality of light guides 1 are provided so as to be adjacent to one another. Adjacent two of the plurality of light guides 1 have shapes where a light emitting section 1b of one of the adjacent two of the plurality of light guides 1 can be positioned so as to be above, i.e., so as to run on a light guiding section 1a of the other of the adjacent two of the plurality of light guides 1. This allows a flat and large outputting surface to be made up of outputting surfaces 1c of the respective plurality of light guides 1.

Note that reflecting sheets 3 are provided on respective rear surfaces (opposite surfaces of the respective outputting surfaces 1c) of the plurality of light guides 1.

The surface light source apparatus 41 (the backlight) further includes (i) a substrate 4 on which the illumination apparatus 31 is supported, (ii) an optical sheet 5 provided behind the liquid crystal display panel 21 (i.e., the optical sheet 5 is provided on a side of the liquid crystal display panel 21 which side is opposite to a side on which a display surface is provided), and (iii) space maintaining sections 6 which cause the optical sheet 5 and the outputting surfaces 1c of the respective plurality of light guides 1 to be away from each other by a given distance.

According to the configuration, a rear surface of the optical sheet 5 and the outputting surfaces 1c of the respective plurality of light guides 1 and are away from each other by the given distance and face each other. The rear surface of the optical sheet 5 is irradiated with light surface-emitted from each of the outputting surfaces 1c of the respective plurality of light guides 1.

<Luminance Uniformity>

Figure 2:
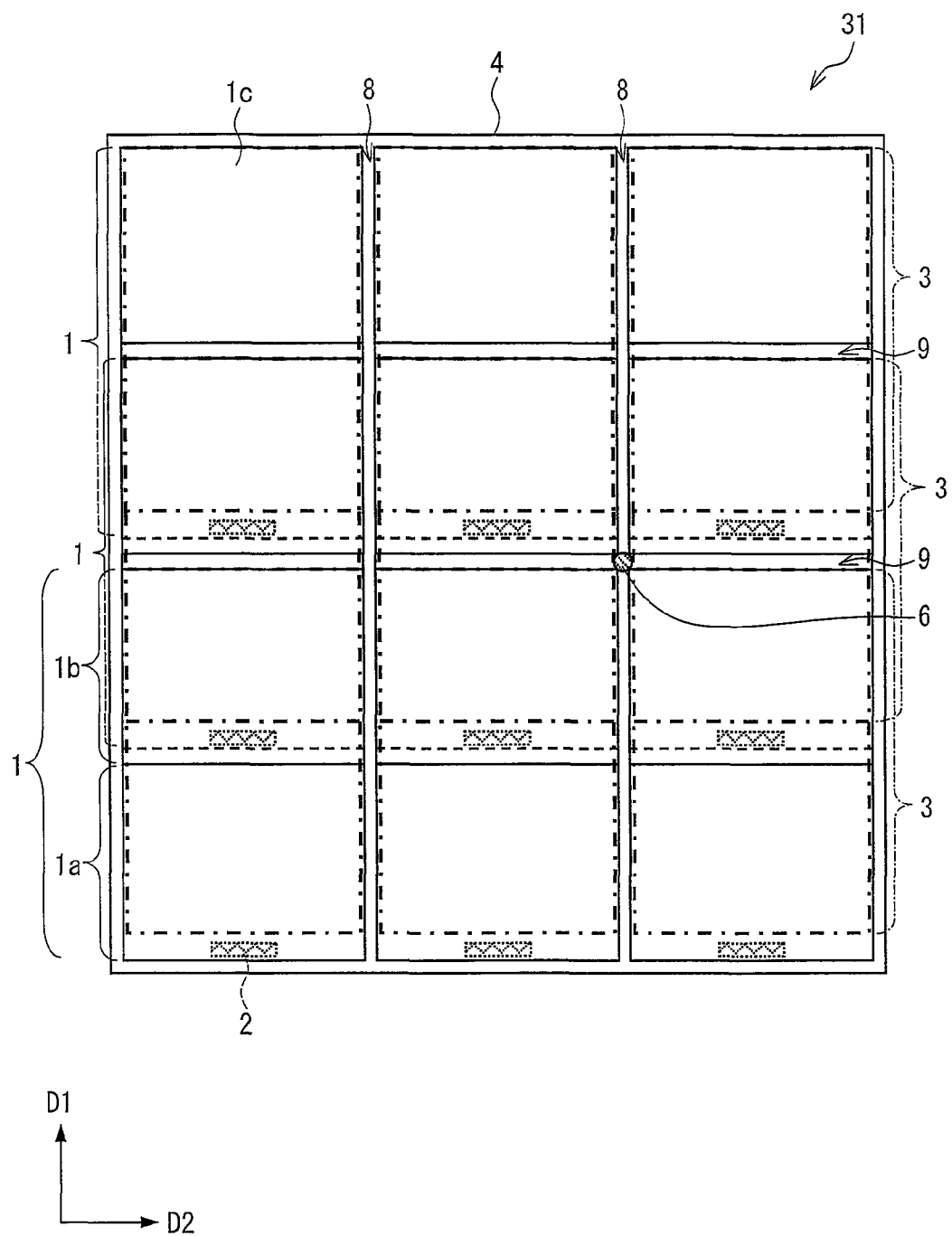
FIG. 2
Figure 3:
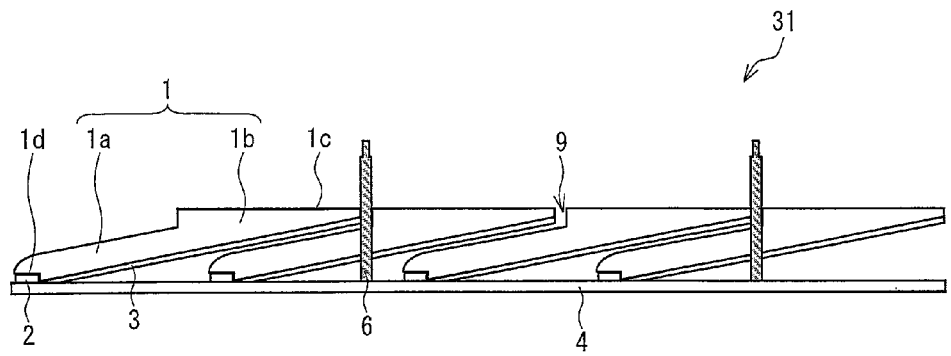
FIG. 3
Figure 4:
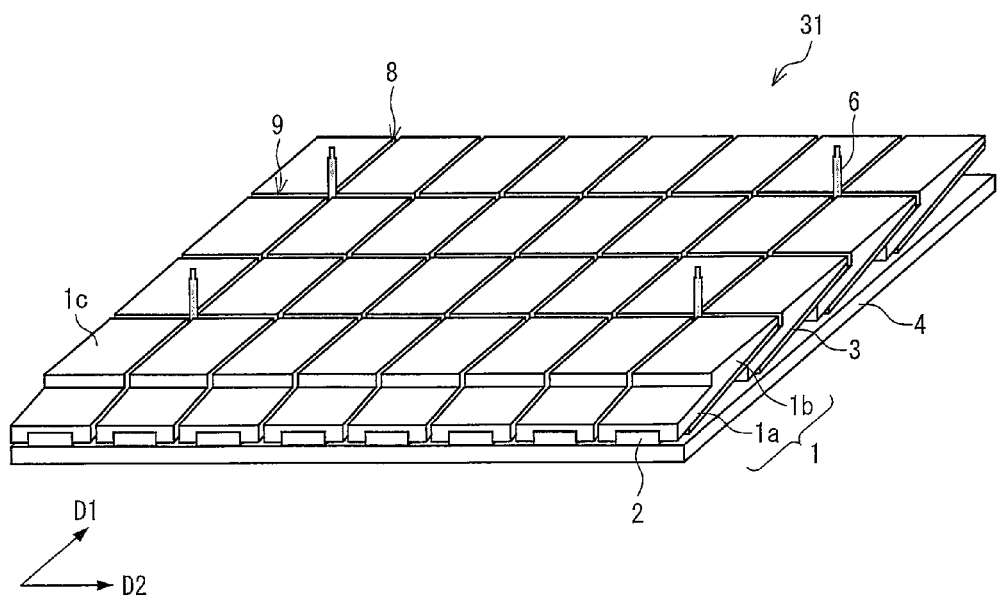
FIG. 4

With reference to FIGS. 2 through 4, the following description discusses in detail (i) how the illumination apparatus 31 is configured in the liquid crystal display apparatus 10 of the present embodiment and (ii) luminance uniformity of the illumination apparatus 31.

FIG. 2 is a plan view obtained when the illumination apparatus 31 in the liquid crystal display apparatus 10 of the present embodiment is viewed from above the outputting surfaces 1c of the respective plurality of light guides 1. FIG. 3 is a side view showing the illumination apparatus 31. FIG. 4 is a perspective view showing the illumination apparatus 31.

The plurality of light guides 1 are generally manufactured in accordance with a minus tolerance, by taking into consideration at least the fact that (i) the plurality of light guides will damage one another, (ii) the illumination apparatus should be thin, and (iii) a manufacturing error will occur. It follows that gaps, which correspond to such a minus tolerance, occur in respective joint regions where corresponding two of the plurality of light guides are juxtaposed. On a light emitting surface which is made up of juxtaposition of the outputting surfaces of the respective plurality of light guides, the gaps are viewed as respective regions where no light emission is carried out. In view of the circumstances, in a case of employing, as a backlight of a display apparatus, an illumination apparatus in which a plurality of light guides are thus provided, it is necessary to take various measures to improve the quality of a display image so that no luminance unevenness occurs.

Note that, according to the illumination apparatus 31 included in the liquid crystal display apparatus 10 of the present embodiment, there are two (2) types of gaps in view of their causal mechanisms. One of them is a gap 8 (later discussed) between adjacent two of the plurality of light guides 1 which are juxtaposed so as not to overlap each other. The other is a gap 9 (later discussed) between another adjacent two of the plurality of light guides 1 which are juxtaposed so as to overlap each other.

Note here that directions D1 and D2 are defined as follows. The direction D1 is a direction in which the another adjacent two of the light guides 1 are juxtaposed so that the light emitting section 1b of one of the another adjacent two of the light guides 1 is above the light guiding section 1a of the other of the another adjacent two of the light guides 1 (see FIGS. 2 and 4). The another adjacent two of the light guides 1 are thus juxtaposed in the direction D1 so as to partially overlap each other. On the other hand, the direction D2 is a direction which intersects (extends substantially orthogonally to) the direction D1. The adjacent two of the light guides are juxtaposed in the direction D2 so as not to overlap each other.

The gap 8, between the adjacent two of the plurality of light guides 1 which are juxtaposed so as not to overlap each other, indicates a gap 8 between the adjacent two of the plurality of light guides 1 which are juxtaposed in the direction D2 (see FIGS. 2 and 4). That is, the adjacent two of the plurality of light guides 1 which are juxtaposed in the direction D2 never overlap each other.

The gap 9, between the another adjacent two of the light guides 1 which are juxtaposed so as to overlap each other, indicates a gap 9 between outputting surfaces 1c of the respective another adjacent two of the plurality of light guides 1, in a case where the another adjacent two of the plurality of light guides are juxtaposed so that the light emitting section 1b of the one of the another adjacent two of the plurality of light guides 1 is above the light guiding section 1a of the other of the another adjacent two of the plurality of light guides 1 (see FIG. 3). That is, the gap 9 indicates a gap 9 between the another adjacent two of the plurality of light guides 1 which are juxtaposed in the direction D1 (see FIGS. 2 and 4).

The illumination apparatus 31 included in the liquid crystal display apparatus 10 of the present embodiment is thus a tandem illumination apparatus in which a light emitting section 1b of one of another adjacent two of light guides 1 is above a light guiding section 1a of the other of the another adjacent two of the light guides 1. According to the tandem illumination apparatus, there exist (i) a gap 8 between adjacent two of the light guides 1 which are juxtaposed so as not to overlap each other and (ii) a gap 9 between the another adjacent two of the light guides 1 which are juxtaposed so as to overlap each other.

In addition to the gaps 8 and 9, there are other possible causes for deteriorating luminance uniformity of the illumination apparatus 31. Examples of such other possible causes encompass light emitting properties of the respective plurality of light sources and shapes of the respective plurality of light guides.

If luminance uniformity of the illumination apparatus 31 suffers a deterioration due to the above causes, it may be possible to place a diffusing plate, which serves as a light diffuser, directly on the light emitting surface of the illumination apparatus 31. However, even in this case, it is still impossible to completely uniformly diffuse the light emitted from the illumination apparatus 31. It is therefore very difficult to obtain a surface light source apparatus whose luminance uniformity is high. In order for a surface light source apparatus to have high luminance uniformity, it may be possible to (i) thicken the diffusing plate or to (ii) provide two diffusing plates. Although this may improve the luminance uniformity of the surface light source apparatus, there will be another problem that a deterioration in luminance is caused. As such, neither of such measures (i) and (ii) is preferable.

In view of the circumstances, in the surface light source apparatus 41 of the liquid crystal display apparatus 10 in accordance with the present embodiment, a configuration described as follows is employed. Specifically, the space maintaining sections 6 are provided so that the optical sheet 5 and the outputting surfaces 1c of the respective plurality of light guides 1 are away from each other by the given distance (see FIG. 1). In this case, the optical sheet 5 is a target to be irradiated with light emitted from each of the outputting surfaces 1c of the respective plurality of light guides 1.

Such a configuration allows a given space to be secured between the optical sheet 5 and the light emitting surface which is made up of a plurality of the outputting surfaces 1 of the respective plurality of light guides 1. In the given space, the light emitted from each of the outputting surfaces 1c of the respective plurality of light guides 1 overlaps one another in multiple directions. This allows an improvement in luminance uniformity.

By employing the space maintaining sections 6, it is possible to protect a surface of the optical sheet 5, in addition to reducing luminance unevenness. Such an effect of protection of the surface of the optical sheet 5 can be attained since employing of the space maintaining sections 6 allows the optical sheet 5 and the plurality of light guides 1 to be away from each other by the given distance, unlike in a configuration in which an optical sheet is in close contact with a light guide. Thus, the configuration employing the space maintaining sections 6 is suitable also for the protection of the surface of the optical sheet 5.

The space maintaining sections 6 are described in detail below.

<Space Maintaining Sections>

It is preferable that the space maintaining sections 6 are provided in respective regions where luminance in the light emitting surface made up of a plurality of outputting surfaces 1c is low. This is because, in a case of providing the space maintaining sections 6 in such respective regions, it is possible to decrease a fraction of a light potion, which is emitted from the light emitting surface but reflected by the space maintaining sections 6, to the entire light outputted from the light emitting surface. This allows the space maintaining sections 6 to less affect the luminance distribution on the light emitting surface.

Examples of the regions where the luminance is low encompass the gaps 8 and 9, each of which is the region where no light emission is carried out. For example, as shown in FIG. 2, the space maintaining sections 6 can be provided on the vertical lines where the gap 8 is provided.

In this case, taking into consideration evenness of levels to which the space maintaining sections 6 affect an optical property, it is preferable to select intersections of the gaps 8 and 9 as regions where to provide the respective space maintaining sections 6. That is, according to the illumination apparatus 31 included in the liquid crystal display apparatus 10 of the present embodiment, it is most preferable to provide the space maintaining sections 6 on the substrate 4 onto which the plurality of light sources 2 are mounted, so that the space maintaining sections 6 protrude from respective regions in each of which a corresponding one of the gaps 8 and that of the gaps 9 are substantially orthogonal to each other (see FIG. 2).

According to the configuration, the space maintaining sections 6 are provided as described below, so as to protrude from the respective regions in each of which a corresponding one of the gaps 8 and that of the gaps 9 are substantially orthogonal to each other. Specifically, each of the space maintaining sections 6 is located in an intersection of a corresponding one of the gaps 8 and that of the gaps 9 in corresponding four of the plurality of light guides 9, so that light emitting surfaces 1b of the corresponding four of the plurality of light guides 1 are symmetric to one another with respect to the location of the space maintaining section 6. With the configuration, it is possible for each of the space maintaining sections 6 to evenly affect optically the outputting surfaces 1c of the corresponding adjacent four of the plurality of light guides 1. This allows an improvement in luminance uniformity of the light emitting surface which is made up of the outputting surfaces 1c of the respective plurality of light guides 1.

FIG. 1 schematically shows how light outputted from the light emitting surface is directed in the liquid crystal display apparatus 10 of the present embodiment. As shown in FIG. 1, the space maintaining sections 6 are provided so as to increase a distance between the light emitting surface and the optical sheet 5. Thus, the light outputted from the light emitting surface can be uniformly irradiated toward the optical sheet 5.

Furthermore, according to the present embodiment, the space maintaining sections 6 are made from a material having a light transmitting property and a light reflecting property, so that it is possible to prevent the light from being blocked or reflected by the space maintaining sections 6. This allows a reduction in amount of light blocked by the space maintaining sections 6 and a reduction in amount of light reflected by the space maintaining sections 6. In addition, since no space maintaining section 6 blocks or reflects light emitted from the light emitting surface, it is possible to prevent a decrease in luminance and a deterioration in luminance uniformity.

Examples of the material having the light transmitting property and the light diffusing property encompass a mixture of a transparent resin such as acryl or polycarbonate and a particle made from a material, such as oxide titan or barium sulfate, which has a light scattering property.

Each of (a) through (c) of FIG. 5 is a view showing an exemplary shape of a side surface of a space maintaining section 6 and an exemplary shape of a bottom surface of the space maintaining section 6. Note that the bottom surface of the space maintaining section 6 is a surface which is fixed to the substrate.

(a) of FIG. 5 shows that a space maintaining section 6 has a conical shape in which (i) a cross section of a lateral side of the space maintaining section 6 has an isosceles triangle shape and (ii) a bottom surface of the space maintaining section 6 has a circular shape. One end of the space maintaining section 6 is in contact with the optical sheet 5. A tip part of the one end of the space maintaining section 6 is relatively thinner so that a part where the one end of the space maintaining section 6 and the optical sheet 5 are in contact with each other has a reduced area. The shape of the space maintaining section 6 is not limited to such a conical shape. Instead of the conical shape, a truncated cone shape can be employed in order to satisfy this shape.

(b) of FIG. 5 shows that a space maintaining section 6 has a columnar shape in which (i) a cross section of a lateral side of the space maintaining section 6 has a rectangular shape and (ii) a top surface (a surface which is in contact with the optical sheet 5) and a bottom surface of the space maintaining section 6 have a circular shape.

(c) of FIG. 5 shows that a space maintaining section 6 has a prismatic shape, i.e., has a sectional side of prismatic shape and has a top surface and a bottom surface which have a quadrangle shape.

In the present invention, the shape of the space maintaining section 6 is not limited to the shapes exemplified above. By taking into consideration factors such as light scattering, it is preferable that an area of a region where the space maintaining section 6 and the optical sheet 5 (optical member) are in contact with each other is as small as possible, provided that the optical sheet 5 and the liquid crystal display panel 21 can be supported without any problem.

Further, in order for the space maintaining section 6 to have an isotropic light transmitting property and an isotropic light diffusing property, it is preferable that the shape of the space maintaining section 6 is solid of revolution. Therefore, the conical shape exemplified in (a) of FIG. 5, the truncated cone shape, and the columnar shape exemplified in (b) of FIG. 5 are more preferable than the prismatic shape exemplified in (c) of FIG. 5.

Each of (a) and (b) of FIG. 6 is a cross sectional view showing an exemplary method of how the optical sheet 5 and the space maintaining section 6 are fixed to each other. The method is applicable to fixing of the substrate 4 and the space maintaining section 6, and this is discussed later.

(a) of FIG. 6 shows a configuration in which part of a space maintaining section 6a, having a columnar shape (see (b) of FIG. 5), is (i) fitted in a tubular hole provided in the optical sheet 5 and (ii) adhered and fixed to the tubular hole by use of a transparent adhesive agent 13.

(b) of FIG. 6 shows a configuration in which a space maintaining section 6 is fixed to the optical sheet 5, the space maintaining section 6 having a tip that is partially thinned so as to be closely fitted in the tubular hole in the optical sheet 5.

The present embodiment employs the method shown in (b) of FIG. 6 in which method it is not necessary to use a transparent adhesive agent 13. It is not necessary to fix the space maintaining section 6 to the optical sheet 5 by use of an adhesive agent or the like, provided that no optical sheet 5 placed on a top surface of the space maintaining section 6 moves so as to be displaced.

It is possible to employ a method other than the above described one in which the space maintaining section 6 is fitted in and fixed to the tubular hole provided in the optical sheet 5 by intrusion. For example, it is possible to employ a method which prevents displacement of the optical sheet 5 by pressing the optical sheet 5 and the space maintaining section 6 by use of an external frame or the like while the optical sheet 5 and the space maintaining section 6 are being in contact with each other.

Note that intervals at which the space maintaining sections 6 are provided are not limited to particular ones. That is, although the space maintaining sections 6 can be provided in respective intersections of the gaps 8 and the gaps 9, the present embodiment is not limited to this. The intervals, at which the space maintaining sections 6 are provided, should be determined in view of maintaining of well-balanced relations between (i) minimization of an adverse affect that the space maintaining section 6 causes luminance unevenness and (ii) maintaining of a uniform distance between the outputting surfaces 1c and the optical sheet 5. For example, in an illumination apparatus 31 which is used as a backlight of a normal household liquid crystal display apparatus (e.g., a liquid crystal display apparatus whose size is approximately 30 inches), the space maintaining sections 6 can be provided at intervals of several tens of centimeters (cm) in lengthwise and widthwise directions.

Note that, according to the present embodiment, the distance between the optical sheet 5 and the light emitting surface, which is made up of the outputting surfaces 1c of the respective plurality of light guides 1, is set to 3.0 mm. In this case, a length of the space maintaining section 6 should be determined by taking into account (i) a distance between the substrate 4 and the light emitting surface, (ii) a length of part of the space maintaining section 6 which part is fitted into the hole provided in the optical sheet 5, and (iii) a length of part of the space maintaining section 6 which part is fitted into a hole provided in the substrate 4.

The following description discusses in detail the substrate 4 onto which the plurality of light sources 2 are mounted.

<Substrate>

According to the present embodiment, the space maintaining sections 6 are provided on the substrate 4. The space maintaining sections 6 are provided for causing the light emitting surface and the optical sheet 5 to be away from each other by the given distance.

Each of (a) and (b) of FIG. 7 is a cross sectional view showing an exemplary method of how the space maintaining sections and the substrate are fixed.

(a) of FIG. 7 shows a configuration that part of a space maintaining section 6a, having a columnar shape as shown in (b) of FIG. 5, is (i) fitted into a tubular hole provided in the substrate 4 and (ii) adhered and fixed to the tubular hole by use of an adhesive agent 14.

(b) of FIG. 7 shows a configuration that the space maintaining section 6 is fixed to the substrate 4, the space maintaining section 6a having a tip part that is partially thinned so as to be closely fitted in the tubular hole provided in the substrate 4.

According to the present embodiment, the space maintaining section is fixed to the substrate by employing a method shown in (b) of FIG. 7 in which method the necessity of using an adhesive agent 14 is eliminated in view of workability.

The substrate 4 is provided so that the plurality of light sources 2 can be provided on it. For an improvement in luminance, it is preferable that a color of the substrate 4 is white. Note that, although it is not illustrated in the drawings, drivers (not illustrated) for controlling each of LEDs constituting light sources 2 to turn on or off are provided on a rear surface of the substrate (on a surface opposite to a surface on which the plurality of light sources 2 are provided). That is, the drivers and the LEDs are mounted on the same substrate 4. Since this can reduce the number of substrates and the number of connectors that connect the substrates, it is possible to reduce the cost of producing the illumination apparatus 31. Further, since the number of the substrates is reduced, it is possible to reduce a thickness of the liquid crystal display apparatus 10.

Note that location where respective tubular holes are provided in the substrate 4 can be determined based on (i) locations where the respective plurality of light sources 2 are provided on the substrate 4 and (ii) shapes of the respective plurality of light guides 1.

<Optical Sheet>

The optical sheet 5 is made up of at least a diffusing plate that diffuses incident light so as to improve luminance uniformity. Preferably, the optical sheet 5 is made up of a combination of the diffusing plate and a multifunction optical sheet. The multifunction optical sheet has two or more optical functions selected from various optical functions of diffusing, refracting, converging, and polarizing.

For example, a diffusing plate whose thickness is approximately from 2 mm to 3 mm can be employed as an example of the optical sheet 5. The diffusing plate is provided so as to be away from the illumination apparatus 31 by a distance of approximately a few millimeters (mm). Note, however, that (i) the thickness of the diffusing plate is not limited to the thickness described above and (ii) the distance between the diffusing plate and the illumination apparatus 31 is not limited to the distance described above.

The diffusing plate is provided so as to face the light emitting surface which is made up of the plurality of outputting surfaces 1c and so as to cover the entire light emitting surface. The space maintaining sections 6 are provided so that the diffusing plate is away from the light emitting surface by the given distance. The diffusing plate diffuses the light outputted from the light emitting surface.

For example, a diffusing sheet, a prism sheet, and/or a multifunction optical sheet such as a polarized light reflecting sheet, each having a thickness of several hundreds of micrometers (μm), can be stacked on the diffusing plate so that it is possible to secure further excellent luminance and luminance uniformity as the surface light source apparatus 41.

The thicknesses and the configuration described above are merely illustrative. The present embodiment is therefore not limited to them.

The multifunction optical sheet is made up of two or more sheets which are stacked. The multifunction optical sheet uniformizes and converges the light outputted from each of the outputting surfaces 1c of the respective plurality of light guides 1, and then directs the light thus uniformized and converged toward the liquid crystal display panel 21.

That is, the following optical sheet (i), (ii), and/or (iii) can be employed as the multifunction optical sheet: (i) a diffusing sheet that converges and scatters incident light, (ii) a lens sheet that converges incident light so as to improve luminance in a front direction (a direction in which the liquid crystal display panel 21 is provided), and/or (iii) a polarized light reflecting sheet that reflects one of polarized light components and passes through the other of the polarized light components, so as to improve luminance in the liquid crystal display apparatus 10. It is preferable that the optical sheets (i) through (iii) are used in combination as needed in accordance with cost and/or performance of the liquid crystal display apparatus 10.

With reference to FIG. 1, the following description further discusses the liquid crystal display apparatus 10 of the present embodiment.

As shown in FIG. 1, each of the reflecting sheets 3 is provided so as to face and cover a corresponding rear surface (an opposite surface of a corresponding outputting surface 1c) of a corresponding one of the plurality of light guides 1. Each of the reflecting sheets 3 reflects light outputted from the corresponding rear surface of the corresponding one of the plurality of light guides 1, so as to direct the light toward the corresponding one of the plurality of light guides 1. Thus, each of the reflecting sheets 3 has a role to improve a light use efficiency of the corresponding one of the plurality of light guides 1. More specifically, each of the reflecting sheets 3 (i) reflects light, which has entered the corresponding rear surface at an angle equal to or smaller than a total reflection critical angle with respect to a normal line of the corresponding rear surface, which total reflection critical angle varies depending on a material of the corresponding one of the plurality of light guides 1, and thus passed through the corresponding one of the plurality of light guides 1, and (ii) directs the light toward the corresponding one of the plurality of the light guides 1.

It is necessary, in the corresponding one of the plurality of light guides 1, to minimize light losses caused by a corresponding light guiding section 1a. This allows light, which has entered a corresponding incident surface 1d that faces a corresponding light source 2, to be efficiently outputted from a corresponding outputting surface 1c (see FIGS. 1 and 3).

Upper surface and lower surface of each of the plurality of light guides 1 are made substantially parallel with each other, so that the light, which enters each of the plurality of light guides 1, is guided in the corresponding one of the light guiding sections 1a while satisfying a total reflection condition. This allows the each of the plurality of light guides 1 to have configurations in which a light amount is maintained.

Further, as shown in FIG. 1, the light outputting surfaces 1c are provided so as to be substantially parallel with the optical sheet 5. In a case of designing a surface light source apparatus 41 in which the illumination apparatus 31 of the present invention and the optical sheet 5 are used in combination so that it is possible to carry out uniform surface emission, this easily allows a uniform distance between the light outputting surfaces 1c to the optical sheet 5. It is therefore possible to give rise to a merit that optical design for uniform surface emission becomes easier.

Further, the adjacent two of the plurality of light guides 1 are (i) provided so as to be inclined with respect to the optical sheet 5 to be illuminated and (ii) juxtaposed so as to partially overlap each other. Each outputting surface 1c of the adjacent two of the light guides 1 is not in parallel with a corresponding rear surface of the adjacent two of the light guides 1. As such, the light emitting sections 1b of the adjacent two of the light guides 1 are configured so as to be tapered (thinner) as it is farther from the respective light sources 2. That is, the light emitting sections 1b are configured so that the respective rear surfaces that are surfaces opposite to the outputting surfaces 1c are provided so as to be gradually closer to the respective outputting surfaces 1c.

With the configuration, a total reflection condition of the light, which is guided inside each of the any adjacent two of the light guides 1, gradually fails to be met as the light travels farther from the corresponding light source 2. Eventually, the light is outputted from the corresponding outputting surface 1c.

It is preferable that a front surface (the outputting surface 1c) or the rear surface of each of the light emitting sections 1b is subjected to a process (fine concavo-convex process) or a treatment that directs outside the light which has been guided in the each of the light emitting sections 1b. Examples of the process or the treatment encompass prisming, texturing, printing, and the like. However, the process or the treatment is not limited to any particular one. Any known method can be employed as the process or the treatment, as needed.

The plurality of light guides 1 can be made from a transparent resin such as polycarbonate (PC) or polymethyl methacrylate (PMMA). However, the plurality of light guides 1 are not limited to this. The plurality of light guides 1 can be therefore made from a material which is normally used as a material of a light guide. The plurality of light guides 1 can be prepared by a method such as injection molding, extrusion molding, heat-press molding, or cutting. Note, however, that the present embodiment is not limited to this. It is therefore possible to employ any method, provided that it is a processing method which brings about an effect similar to that of any of the above methods.

Each of the light sources 2 is provided for a corresponding one of the light guides 1 so as to extend along an end part of a corresponding light guide part 1a (see FIG. 4). The each of the light sources 2 is not limited to a particular type. However, according to the present embodiment, light emitting diodes (LED) which are dot-like light sources are used as the light source 2.

Further, a configuration, in which plural kinds of light emitting diodes having different emission colors are included, can be used as the light source 2. Specifically, such a configuration is realized by an LED group in which a plurality of R G, and B light emitting diodes of three (3) emission colors of red, green, and blue are arranged. It is possible to output light which is white in color in each of the light emitting surfaces 1c, by employing the light source 2 which is constituted by a combination of the R, G, and B light emitting diodes of the three emission colors.

Color combinations of the light-emitting diodes can be determined, as needed, in accordance with (i) the color characteristics of the light-emitting diodes of different colors, (ii) the color characteristic of the surface light source apparatus 41 as required in accordance with a purpose for which the liquid crystal display apparatus 10 is used, and/or the like. Note that a side emission LED, in which a plurality of LED chips having different colors are molded in a single package, may be used. This makes it possible to obtain an illumination apparatus 31 whose color reproduction range is wide.

According to the present embodiment, a transmissive liquid crystal display panel is used as the liquid crystal display panel 21. In the transmissive liquid crystal display panel, a display is carried out by causing light emitted from the surface light source apparatus 41 (backlight) to transmit the transmissive liquid crystal display panel.

Note that the liquid crystal display panel 21 is not limited to a particular configuration. A known liquid crystal display panel can therefore be appropriately employed as the liquid crystal display panel 21. The liquid crystal display panel 21 includes, for example, (i) an active matrix substrate in which a plurality of TFTs (thin film transistors) are provided, (ii) a color filter substrate provided so as to face the active matrix substrate, and (iii) a liquid crystal layer sealed, by a sealing agent, in between the active matrix substrate and the color filter substrate. Note that the configuration is not shown in the drawings.

According to the surface light source apparatus 41 that is included in the liquid crystal display apparatus 10 of the present embodiment, diffusing means 15 for further diffusing incident light is provided in a region on the optical sheet 5, which region includes a region where the space maintaining section 6 is provided (see FIG. 1).

Examples of a method for providing the diffusing means 15 encompass a method in which the optical sheet 5 is subjected to a rough-surface process so as to have fine concavities and convexities on its surface. The rough-surface process is similar to the foregoing surface processing for the light emitting section 1b.

According to the configuration, the diffusing means 15 for further diffusing the incident light is thus provided in a region on the optical sheet 5, which region includes the region where the optical sheet 5 and the space maintaining section 6 are in contact with each other. This can prevent luminance unevenness from being caused by the space maintaining section 6. It is therefore possible to further reduce luminance unevenness as a whole.

According to the present embodiment, the liquid crystal display apparatus 10 thus includes, as the backlight, the surface light source 41 which is thin in thickness and further improved in luminance evenness without suffering a decrease in luminance. This can realize the liquid crystal display apparatus 10 which is thin in thickness and attain a good display quality.

[Embodiment 2]

Embodiment 2 of the present invention is described below with reference to FIGS. 8 and 9. Note that a configuration which is not described in the present embodiment is identical with that described in the Embodiment 1. For easy description, a member having a function identical to that of the member shown in the drawings in the Embodiment 1 is given a same reference numeral and its description is omitted.

FIG. 8 is a front view obtained when an illumination apparatus 31a included in a liquid crystal display apparatus of the present embodiment is viewed from above an outputting surface 11a.

FIG. 9 is a cross sectional view of the illumination apparatus 31a taken along a line AA in FIG. 8.

A light guide 11 causes light which has been outputted from each of light sources 2L and 2R to be surface-emitted from an outputting surface 11a. Note that a light emitting surface, which is made up of a plurality of outputting surfaces 11a which are juxtaposed to each other, is a surface from which the light is emitted toward a target to be irradiated.

Other constituents are substantially identical to those described in the Embodiment 1, and therefore, their description is omitted.

According to the present embodiment, the illumination apparatus 31a is constituted by two or more light guides 11. That is, the illumination apparatus 31a is configured so that a plurality of combinations, each including of a light guide 11 and a light source 2, are arranged on a single plane.

According to the illumination apparatus 31a of the present embodiment, the plurality of light guides 11 are arranged on the single plane so as not to overlap each other. This causes a flat light emitting surface to be made up of outputting surfaces 11a of the respective plurality of light guides 11 (see FIGS. 8 and 9).

As shown in FIG. 8, the plurality of light guides 11, each of which is provided with two (2) dot-like light sources 2L and 2R (a pair of dot-like light sources), are arranged lengthwise and breadthwise. The illumination apparatus 31a thus has a configuration in which the plurality of light guides 11, each being provided with the two (2) dot-like light sources 2L and 2R, are arranged as is covered with tiles. For this reason, the illumination apparatus 31a is called an illumination apparatus of tile type.

The present embodiment is exemplified by a configuration in which the two (2) dot-like light sources 2L and 2R are provided in vicinities of center regions of respective two (2) opposite sides of each light guide 11 having a rectangular shape. However, the number and location of the dot-like light sources can be determined as needed in accordance with the necessity.

Note here that directions D1 and D2 are defined as follows. As shown in FIG. 8, the direction D1 is a direction in which the two (2) dot-like light sources 2La and 2R are provided, at the respective two (2) opposite sides of each light guide 11 having the rectangular shape, so as to face each other, whereas the direction D2 is a direction which intersects, i.e., extends substantially orthogonally to, the direction D1.

As shown in FIG. 9, the dot-like light sources 2L and 2R are (i) provided in cavities of respective recession parts 11b provided inside the light guide 11 and (ii) provided so as to face each other. Note that the dot-like light sources 2L and 2R are provided on the substrate 12. Further, as shown in FIG. 9, light outputting directions of the respective dot-like light sources 2L and 2R are set so that light emitted from one of the dot-like light sources 2L and 2R is directed toward the other of the dot-like light sources 2L and 2R, and vice versa.

Thus, according to the configuration, the two (2) dot-like light sources 2L and 2R are provided (i) so as to face each other and (ii) so that each one of the two (2) dot-like light sources 2L and 2R emits light toward a region toward which the other one of the two (2) dot-like light sources 2L and 2R cannot emit light.

That is, the dot-like light sources 2L and 2R are oppositely provided so that light emitted from each of the light sources 2L and 2R enters a corresponding light guide 11. As such, since emission regions of the respective dot-like light sources 2L and 2R are superimposed, it is possible to obtain light emission from an entire corresponding outputting surface 11a. Since the present embodiment employs such an illumination apparatus 31a, it is possible to obtain a large-size back light in which there is no dark region.

The present embodiment is thus configured so that the light emitted from each of the dot-like light sources 2L and 2R (i) is propagated inside the corresponding light guide 11 while being subjected to scattering and reflecting, (ii) is outputted from the corresponding outputting surface 11a, and then (iii) reaches a liquid crystal display panel 21 via an optical sheet 5.

Note, however, that even in the illumination apparatus 31a of tile type, a gap 8 occurs, due to a minus tolerance, in a region where any adjacent two of the light guides 11 are juxtaposed so as not to overlap each other (see FIGS. 8 and 9). That is, the gap 8 occurs in a region where the any adjacent two of the light guides 11 are juxtaposed in the direction D1 or D2.

As early described, it is preferable that a space maintaining sections 6 are provided in respective regions where luminance is low on the light emitting surface made up of a plurality of outputting surfaces 11a.

The gap 8, where no light emission is carried out, corresponds to such a region where luminance is low. For example, the space maintaining sections 6 can be provided in a region where the gap 8 is vertically or horizontally caused (see FIG. 8).

In this case, taking into consideration evenness of levels to which the space maintaining sections 6 affect an optical property, it is preferable to employ a configuration as shown in FIG. 8 so that each of the space maintaining sections 6 protrudes from a corresponding one of the regions where the gaps 8, which are between adjacent two of the plurality of light guides 11 which are juxtaposed so as not to overlap each other, are substantially orthogonal to one another, in other words, each of the space maintaining sections 6 is located so that light emitting surfaces 11a of the corresponding adjacent four of the plurality of light guides 1, which form the gaps 8, are symmetric to one another with respect to the location of the space maintaining section 6.

With the configuration, it is possible that each of the space maintaining sections 6 evenly affects optical properties of light outputting surfaces 11a of corresponding adjacent four of the plurality of light guides 1. This makes it is possible that the space maintaining sections 6 evenly affect the luminance distribution in the light emitting surface made up of the outputting surfaces 11a of the respective plurality of light guides 1. As such, it is possible to improve luminance uniformity in the light emitting surface.

The invention being thus described, it will be obvious that the same way may be varied in many ways. Such variations are not to be regarded as a departure from the spirit and scope of the invention. An embodiment derived from a proper combination of technical means disclosed in different embodiments is intended to be included within the scope of the following claims.

Industrial Applicability

The present invention can be applied to (i) a surface light source apparatus that is used as a backlight of a liquid crystal display apparatus or the like and (ii) a liquid crystal display apparatus including the surface light source apparatus.

Reference Signs List 1, 11. light guide
1a. light guiding section
1b. light emitting section
1c, 11a. outputting surface
2, 2L, 2R. light source
4, 12. substrate
5. optical sheet
6. space maintaining section
8, 9. gap
10. liquid crystal display apparatus
15. diffusing means
31, 31a. illumination apparatus
41. surface light source apparatus

The invention claimed is:
1. A surface light source apparatus, comprising:
a plurality of combinations each including (i) a light source and (ii) a light guide which diffuses light emitted from the light source and causes surface emission of the light;
a substrate on which the light sources are mounted;
an optical sheet provided above a light emitting surface made up of outputting surfaces of the respective light guides; and
a space maintaining section which causes the light emitting surface and the optical sheet to be away from each other by a given distance, the space maintaining section being provided on the substrate so as to protrude from a gap between adjacent two of the light guides which are juxtaposed so as not to overlap each other.

2. The surface light source apparatus as set forth in claim 1, wherein:

each of the light guides has (i) a corresponding light emitting section having a corresponding one of the outputting surfaces and (ii) a corresponding light guiding section that directs, to the corresponding light emitting section, the light emitted from the light source, wherein the light emitting section of any of the light guides is above the light guiding section of adjacent another of the light guides; and the space maintaining section is provided so as to protrude from a region where (a) a gap between adjacent two of the light guides which are juxtaposed so as not to overlap each other and (b) a gap between adjacent two of the light guides which are juxtaposed so as to overlap each other are intersectant to each other at a substantially right angle.

3. The surface light source apparatus as set forth in claim 1, wherein:

the light guides are provided in a single plane so as not to overlap each other; and the space maintaining section is provided so as to protrude from a region where (i) a gap between adjacent two of the light guides which are juxtaposed so as not to overlap each other and (ii) a gap between adjacent two of the light guides which are juxtaposed so as not to overlap each other are intersectant to each other at a substantially right angle.

4. The surface light source apparatus as set forth in claim 1, wherein:

the space maintaining section is made from a material having a light transmitting property and a light diffusing property.

5. The surface light source apparatus as set forth in claim 1, wherein the optical sheet is a diffusing plate.

6. The surface light source apparatus as set forth in claim 1, wherein:

diffusing means for causing incident light to be further diffused is provided, on the optical sheet, in each region which includes a region where the space maintaining section is provided.

7. A liquid crystal display apparatus, comprising, as a backlight, a surface light source apparatus recited in claim 1.

* * * * *